(12) United States Patent
Moss et al.

(10) Patent No.: US 9,159,008 B1
(45) Date of Patent: Oct. 13, 2015

(54) METHOD AND APPARATUS FOR ESTIMATING USAGE OF PRINT SUBSTANCE IN A PRINTER

(71) Applicant: Marvell International Ltd., Hamilton (BM)

(72) Inventors: Roy G. Moss, Palo Alto, CA (US); Douglas Gene Keithley, Boise, ID (US); Nilotpal Sensarkar, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/148,355

(22) Filed: Jan. 6, 2014

Related U.S. Application Data

(63) Continuation of application No. 13/165,577, filed on Jun. 21, 2011, now Pat. No. 8,625,145.

(60) Provisional application No. 61/357,861, filed on Jun. 23, 2010.

(51) Int. Cl.
*G06F 15/00* (2006.01)
*G06K 15/00* (2006.01)
*G06K 15/02* (2006.01)

(52) U.S. Cl.
CPC ........ *G06K 15/4075* (2013.01); *G06K 15/1802* (2013.01)

(58) Field of Classification Search
None
See application file for complete search history.

(56) References Cited

U.S. PATENT DOCUMENTS

| | | | |
|---|---|---|---|
| 2004/0042805 A1 | 3/2004 | Takamatsu et al. | |
| 2004/0156079 A1* | 8/2004 | Marshall et al. | 358/3.21 |
| 2005/0129419 A1* | 6/2005 | Hwang | 399/27 |
| 2007/0077075 A1* | 4/2007 | Filbrich et al. | 399/27 |
| 2008/0247000 A1 | 10/2008 | Lammens et al. | |
| 2009/0290883 A1 | 11/2009 | Nakahara | |

\* cited by examiner

*Primary Examiner* — Helen Q Zong

(57) ABSTRACT

Embodiments of the present disclosure provide a method for estimating usage of a print substance. The method comprises receiving a plurality of pixels of a page to be printed, and generating, for one of the plurality of pixels, a look-up address based on (i) pixel bits of the one of the plurality of pixels, and (ii) pixel bits of one or more other pixels proximal to the one of the plurality of pixels. The method further comprises estimating an amount of print substance deposited on the page at a location associated with the one of the plurality of pixels based on reference to a print substance amount in a table of print substance amounts, wherein the reference to the print substance amount in the table is made using the look-up address.

22 Claims, 6 Drawing Sheets

METHOD AND APPARATUS FOR ESTIMATING USAGE OF PRINT SUBSTANCE IN A PRINTER

CROSS REFERENCE TO RELATED APPLICATIONS

The present disclosure is a continuation of and claims priority to U.S. patent application Ser. No. 13/165,577, filed Jun. 21, 2011, now U.S. Pat. No. 8,625,145, issued Jan. 7, 2014, which claims priority to U.S. Provisional Patent Application No. 61/357,861, filed Jun. 23, 2010, which are incorporated herein by reference.

TECHNICAL FIELD

Embodiments of the present disclosure relate to the field of printers, and more particularly to techniques, devices, and systems for print toner estimation using look-up tables.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During the printing process, printers deposit toner or other print substance onto pages. Maintaining an accurate account of the print substance remaining in a toner cartridge, or other container, allows the printer to be effectively and efficiently maintained. Replacing a print cartridge too soon wastes toner. Failure to replace a print cartridge once it runs low puts the printer out of service, or potentially causes the printer to produce low-quality print jobs.

Conventional techniques typically estimate toner usage from the values of the pixel bits for the image to be printed. For example, the pixels for each line may be added together to obtain an estimate for the total amount of toner used for each line. The estimates for each line are added together to determine a total estimate for each page. A running total of the toner remaining in a toner cartridge is kept over the life of the toner cartridge. In some printer technologies—notably in laser printers—neighboring pixels influence the amount of toner deposited on a page at a particular location defined by a pixel. Thus, some conventional techniques use a linear function to estimate the impact of horizontally adjacent pixels when estimating an amount of toner deposited at a particular location.

SUMMARY

In one embodiment, the present disclosure provides a method for estimating usage of a print substance. The method comprises receiving a plurality of pixels of a page to be printed, and generating, for one of the plurality of pixels, a look-up address based on (i) pixel bits of the one of the plurality of pixels, and (ii) pixel bits of one or more other pixels proximal to the one of the plurality of pixels. The method further comprises estimating an amount of print substance deposited on the page at a location associated with the one of the plurality of pixels based on reference to a print substance amount in a table of print substance amounts, wherein the reference to the print substance amount in the table is made using the look-up address.

In another embodiment, the present disclosure provides a system comprising memory configured to store an estimate of usage of a print substance, and an address generation component configured to generate look-up addresses for a plurality of pixels of a page to be printed. The look-up addresses are based on (i) pixel bits of particular pixels of the plurality of pixels and (ii) pixel bits of one or more neighboring pixels. The system further comprises an estimation component configured to iteratively update the estimate of usage of a print substance based on reference to a print substance amount in a table of print substance amounts using the generated look-up addresses to determine estimates of usage of the print substance for the plurality of pixels.

In a further embodiment, the present disclosure provides a method comprising generating, by a computing system, a plurality of candidate look-up tables, and generating look-up addresses for a plurality of pixels of one or more pages to be printed. The look-up addresses are based on (i) pixel bits of particular pixels of the plurality of pixels and (ii) pixel bits of one or more neighboring pixels of the particular pixels. The method further comprises determining, for the plurality of candidate look-up tables, corresponding estimates of usage of a print substance based on look-up operations to the one or more candidate look-up tables using the generated look-up addresses, and comparing the corresponding estimates of a print substance to an actual amount of usage of the print substance to identify one or more of the plurality of candidate look-up tables to be used for subsequent print substance estimation.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Overview

Figure 1:
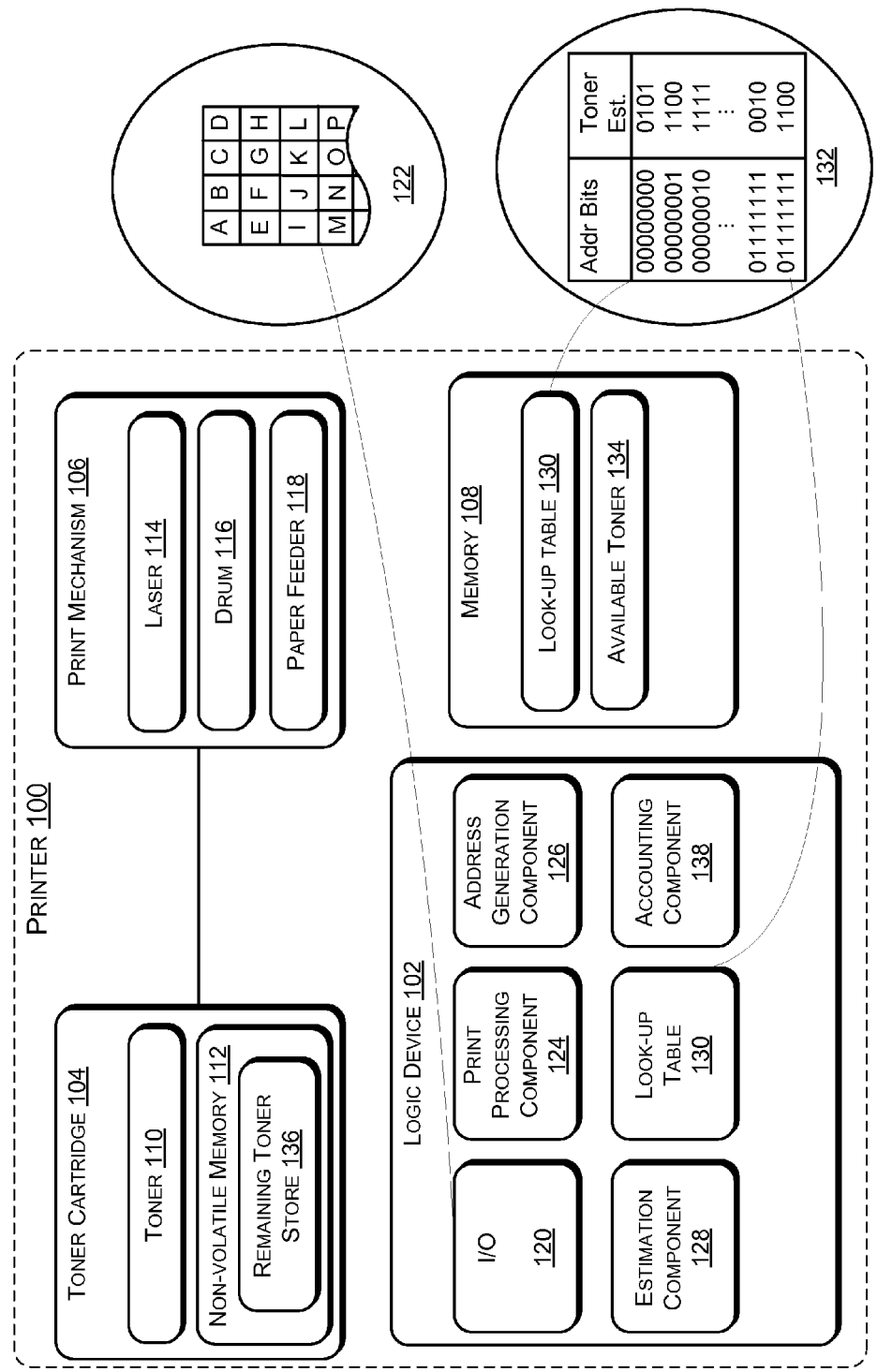
FIG. 1 is a schematic diagram of an example environment usable to estimate print substance usage.

As discussed previously, conventional toner estimation techniques typically apply a linear function to horizontally adjacent pixels to estimate the influence of those horizontally adjacent pixels on the toner deposited at a particular location. But in many printer technologies—such as for example laser printing technologies—the influence of adjacent pixels is non-linear. Embodiments of the present disclosure take the non-linear nature of printing into account when estimating toner usage, thereby improving the accuracy of toner estimation relative to conventional toner estimation techniques that utilize linear functions. In addition to horizontally adjacent pixels, vertically adjacent pixels and proximal pixels that are not directly adjacent to a pixel also influence the amount of toner deposited on a page at a certain location. Embodiments of the present disclosure utilize information from vertically adjacent and other proximal pixels to estimate toner usage, thereby producing relatively more accurate estimates of toner usage.

Embodiments of the present disclosure utilize a look-up table to estimate toner usage. To estimate the amount of toner deposited on a page at a particular location, pixel bits of a pixel that corresponds to that particular location, as well as pixel bits of one or more neighboring or proximal pixels, are used to generate a look-up address. A look-up operation to a look-up table is performed using the generated look-up address. The results of the look-up operation are used to estimate an amount of toner deposited on the page at a location corresponding to the pixel. Toner usage estimates for the other pixels of the page to be printed are determined in the same or similar way, and a running estimate is accumulated for each page. The total-page estimate is then used to decrement an estimated amount of toner available to the printer.

The proximal or neighboring pixels used to construct the address are vertically proximal and/or horizontally proximal to the pixel at issue. Two, three, four, or more neighboring or proximal pixels may be used in embodiments. The proximal or neighboring pixels can be directly adjacent to the pixel at issue, but they do not need to be directly adjacent. In one non-limiting example, in embodiments that utilize scaling to print an image at a lower resolution, the pixels that are used to determine a look-up address for a particular location include pixels that are directly proximal to a pixel that corresponds to the particular location, as well as other pixels that are proximal to, but not directly adjacent, to the pixel.

The look-up table entries contain estimates of the amount of toner deposited at a particular location on a page when a particular pattern of pixels is present in the print image on or near that particular location. Look-up tables according to embodiments are selected using actual print results. For example, one or more candidate look-up tables may be generated using various functions, such as linear or non-linear functions. Alternatively, candidate look-up tables may be generated using other information, such as actual toner usage in similar printers, or candidate look-up tables may be based on engineering estimates. A test printer is used to print various test images or documents, and the actual amount of toner used to print those pages is determined. For example, a toner cartridge may be weighed before and after the test printing in order to determine the weight of the toner deposited during the test printing. The pixel data associated with the test print is used to determine look-up addresses, and look-up operations to the one or more candidate look-up tables used to produce estimates of the amount of toner deposited during the test print. The candidate look-up table that most closely estimates the actual toner usage is selected for use in production printers. Alternatively, the best candidate table or tables are modified to determine a more accurate look-up table. These modified tables are also tested.

A printer manufacturer may go through various rounds of testing, using various candidate tables, and using various test prints—text documents, photographic images, and so forth—that the manufacturer deems to be representative of print jobs for which the printers will be used. Once a look-up table for a particular printer model is selected, the look-up table is stored in a printer, either within embedded logic such as an application-specific integrated circuit (ASIC), a programmed memory area of a field programmable gate array (FPGA), in a non-volatile memory, or other storage device. The look-up table may be developed for each individual printer, for each manufacturing batch of printers, for all printers of a particular model, for all printers of a particular group of models, or some other grouping of printers. Printers according to embodiments utilize the selected look-up table to estimate toner usage in order to maintain a running total of the toner remaining in a print cartridge or other container as described elsewhere within this Detailed Description.

The present Detailed Description uses the term "toner." Use of the word "toner," which is a type of dry ink, is not meant to be taken in a limiting sense. Embodiments of the present disclosure estimate the usage of various print substances such as toner, ink, dye, wax, and so forth, as well as print substances in various physical states (wet or dry, solid or liquid). The use of the word "toner" is used herein for ease of description and, unless otherwise specified, its use is not meant to be taken in a limiting sense. Furthermore, the present Detailed Description uses the phrase "print cartridge." Embodiments are not limited to determining the amount of print substance remaining in, or taken from, a print cartridge. Various embodiments estimate the amount of print substance remaining in, or taken from, other print substance containers. The use of the phrase "print cartridge" is used herein for ease of description and, unless otherwise specified, its use is not meant to be taken in a limiting sense.

Illustrative Embodiment

FIG. 1 is a schematic diagram of an example printer 100. Printer 100 may be a printer (such as a laser printer, inkjet printer, or other), copier, scanner, a fax machine, a combination device, and so forth. Printer 100 includes logic device 102, toner cartridge 104, print mechanism 106, and memory 108. Logic device 102 is, in various embodiments, an integrated circuit device such as an ASIC, FPGA, and so forth. In other embodiments, logic device 102 may be a general or special-purpose processor configured to execute a plurality of programming instructions to perform the functions of logic device 102 as described herein. Toner cartridge 104 includes toner 110 and non-volatile memory 112 configured to store data related to toner 110. Toner cartridge 104 is physically coupled to print mechanism 106, which includes laser 114, drum 116, paper feeder 118, and so forth.

Logic device 102 includes input/output (I/O) 120 configured to receive pixel data for one or more pages to be printed. The pixel data is arranged, in embodiments, in rows and columns of pixels as shown in inset 122. Pixels shown in a portion of a print image are labeled A-P within inset 122. Logic device 102 includes print processing component 124 configured to process the pixel data for printing via print mechanism 106. The processing may include, for example, scaling of the image to print at a higher or lower resolution.

Logic device 102 includes address generation component 126 configured to generate look-up addresses based on pixel bits of pixels A-P, as shown within inset 122. Address generation component 126 is configured to generate look-up addresses for various locations on a page to be printed that correspond to various ones of pixels A-P. Pixel bits from the corresponding pixels, as well as pixel bits from neighboring or proximal pixels, are used to generate the look-up addresses. In one non-limiting example, pixel bits from pixel F, as well as pixel bits from pixels B, E, G, and J are used to generate a look-up address for use in estimating the amount of toner that is deposited on the location of the page corresponding to pixel F. As noted above, neighboring pixels B, E, G, and J influence the amount of toner deposited at that location, and use of those pixels to determine the look-up address allows this influence to be taken into account when estimating toner usage. In embodiments where the image is scaled for printing, extended neighboring pixels may also be used to determine the look-up address. These extended neighboring pixels include pixels that are not directly adjacent to the pixel at issue (such as for example pixel F). This reflects the fact that upon scaling, a larger number of pixels influences the amount of toner deposited on a page.

Logic device 102 includes estimation component 128. Estimation component 128 is configured to perform a look-up operation to look-up table 130 using look-up addresses generated by address generation component 126. Look-up table 130 is stored, in various embodiments, within a portion of logic device 102 (either hard-coded or in rewritable storage), within memory 108, or within some other suitable portion of printer 100.

Exemplary details of look-up table 130 are shown in inset 132. Look-up table 130 includes one or more entries that include address bits and corresponding toner estimation bits. A look-up operation to look-up table 130 using an address generated by address generation component 126 returns a corresponding toner estimation amount. For each pixel within a page or pages to be printed, estimation component 128 performs a look-up operation to look-up table 130, and uses the returned result to update available toner 134, thereby keeping a running total of the toner deposited on the page (or pages) that are printed (or alternatively, a running total of the toner remaining available to the printer without transfer from toner cartridge 104 as described below).

Because look-up table 130 is determined based on actual toner usage in test print jobs (as will be described in more detail below), various non-linear characteristics of actual printing are built into look-up table 130. This allows embodiments to improve on the accuracy of conventional toner usage estimate techniques that utilize linear functions. Use of look-up table 130 also allows these non-linear characteristics to be accounted for without use of complicated non-linear functions in the toner usage estimation process, thereby reducing processing requirements and/or improving processing performance. Of course, embodiments of the present disclosure are usable to estimate toner usage in printers that do not have significant non-linear printing characteristics.

Non-volatile memory 112 of toner cartridge 104 includes remaining toner store 136. In accordance with various embodiments, the interaction between available toner 134 and remaining toner store 136 is as follows. Accounting component 138 of logic device 102 is configured to decrement, in response to a request to print one or more pages, an amount from remaining toner store 136 from toner cartridge 104. In a non-limiting example, accounting component 138 is configured to decrement an estimated five pages worth of toner, or some other amount of toner, from remaining toner store 136. Whatever amount that accounting component 138 decrements from remaining toner store 136, accounting component 138 adds a similar amount to available toner 134.

During printing, estimation component 128 decrements available toner 134 based on look-up operations to look-up table 130. Once available toner 134 reaches a certain level (such as for example zero or some other amount of toner deemed insufficient for further printing), accounting component 138 decrements another amount from remaining toner store 136 and transfers it to available toner 134 for further printing. Printer 100 may be configured to indicate that additional toner should be added and may also be configured to cease printing once remaining toner store 136 reaches a certain level (such as for example zero remaining toner).

Address Generation

Figure 2:
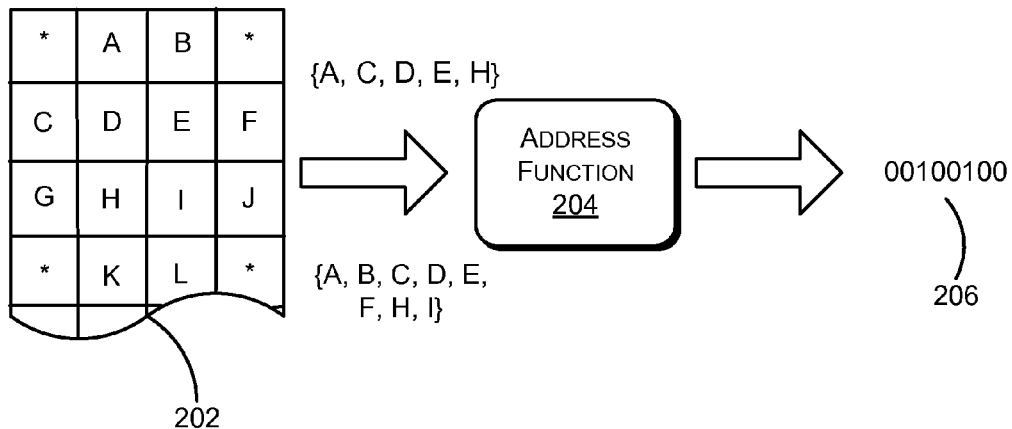
FIG. 2 is a schematic diagram of a print image, and an address-generation function according to embodiments.

FIG. 2 is a schematic diagram of a print image and an address-generation function according to embodiments. Print image 202 includes a plurality of pixels shown as pixels A-L, which have corresponding pixel bits. Print image 202 may include additional pixels that are not shown. In a typical example, a page to be printed may be printed at 600 dots per inch (dpi). A single line of pixels may include 4800 pixels. The relatively small number of pixels shown in FIG. 2 is shown mostly for ease of discussion.

In embodiments, the pixel bits of pixels A-L correspond to darkness levels. Pixels A-L include 1, 2, 3, or more pixel bits corresponding to different levels of darkness. An address function 204 generates look-up addresses for each location on the page represented by pixels A-L. In one non-limiting example, address function 204 generates a look-up address $ADD_D$ 206 for the location on the page associated with pixel D. Address function 204 may include a function F to generate an address $ADD_D$ based on pixel bits of pixel D and pixel bits of one or more proximal pixels, such as pixels A-C and E-L. In a specific example, pixel bits of pixels A, C, D, E, and H are used to generate an address $ADD_D$ (e.g., $ADD_D$=F[A, C, D, E, H]). In another specific example, pixel bits of pixels A, B, C, D, E, F, H, and I are used to generate address $ADD_D$ (e.g., $ADD_D$=F[A, B, C, D, E, F, H, I]). The address $ADD_D$ is used to perform a look-up to a look-up table, and the value returned is used as an estimate for the amount of toner deposited at the location of the page corresponding to pixel D.

Embodiments generate look-up addresses for multiple ones of the locations on the page to be printed. For example, in addition to determining a look-up address $ADD_D$ for the location of the page corresponding to pixel D, embodiments determine look-up address $ADD_E$ for the location associated with pixel E. In a non-limiting example, look-up address $ADD_E$ is generated as a function of the pixel bits of pixel E, as well as pixel bits of proximal or neighboring pixels. In a specific example, pixel bits of pixels B, D, E, F, and I are used to generate an address $ADD_E$ (e.g., $ADD_E$=F [B, D, E, F, I]). This process is repeated for various pixels of the page to be printed, and a running total is accumulated for the estimated amount of toner deposited on a line, a page, and/or pages of a print job as described elsewhere within this Detailed Description.

Figure 3:
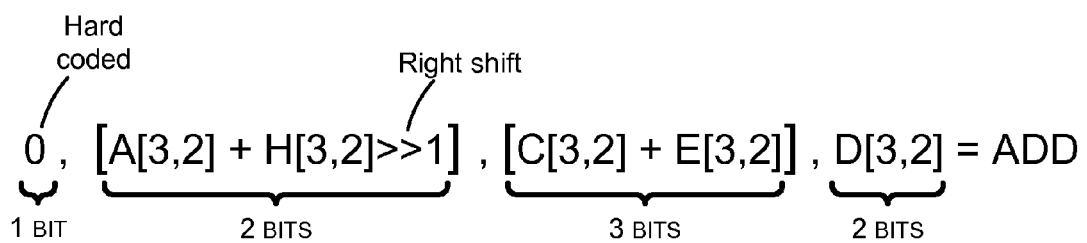
FIG. 3 illustrates an exemplary scheme for generating a look-up address using pixel bits according to various embodiments.

FIG. 3 illustrates an exemplary scheme for generating a look-up address using pixel bits according to various embodiments. Embodiments utilize various schemes for generating look-up addresses from pixel bits of pixels on a page to be printed. In the exemplary scheme shown in FIG. 3, an 8-bit binary number is generated from pixel bits of five pixels as shown. Referring back to the example shown in FIG. 2, the example address shown in FIG. 3 is generated for the location in print image 202 associated with pixel D using pixel bits from pixels A, C, D, E, and H. Pixels in the example shown in FIG. 3 include 4-bit numbers which determine darkness of the pixels. A bit in the most significant position of the look-up address is hard-coded as a 0. The next two most significant bits of the look-up address are determined by adding bits 3 and 2 (the most significant and second-most significant bits) of pixel A to bits 3 and 2 of pixel H (the two directly vertically adjacent pixels), and right-shifting the result of the addition. The next three most significant bits in the look-up address are determined by adding bits 3 and 2 of pixel C and bits 3 and 2 of pixel E (the horizontally adjacent pixels). The result is a 3-bit number which is used to form three bits of the look-up address. The two least-significant bits of the look-up address are determined by bits 3 and 2 of pixel D. Because two bits of the generated look-up address are determined from the vertically adjacent pixels while three bits of the generated address are determined from the horizontally adjacent pixels, pixel bits from the vertically adjacent pixels are weighted less than are pixel bits of the horizontally adjacent pixels in generation of the look-up address. This may reflect, for example, that horizontally adjacent pixels have a greater influence on the amount of toner deposited on the page than do vertically adjacent pixels in a particular printer. In other examples not shown in FIG. 3, vertically adjacent pixels may be weighted more than horizontally adjacent pixels. In other embodiments, pixels to the right may be weighted more than pixels to the left, and vice versa. In still other embodiments, pixels above may be weighted more than pixels below and vice versa. Please note that embodiments are not limited to weighting some pixels over other pixels.

Other schemes are available to generate look-up addresses. Look-up addresses according to various other embodiments utilize more or fewer pixels than the example shown in FIG. 3. Look-up addresses according to various embodiments utilize a first scheme to generate a first look-up address for a first page location, and a second scheme to generate a second look-up address for a second page location. The example shown in FIG. 3 is exemplary, and is not meant to be taken in a limiting sense.

Address Generation with Windowing

Figure 4:
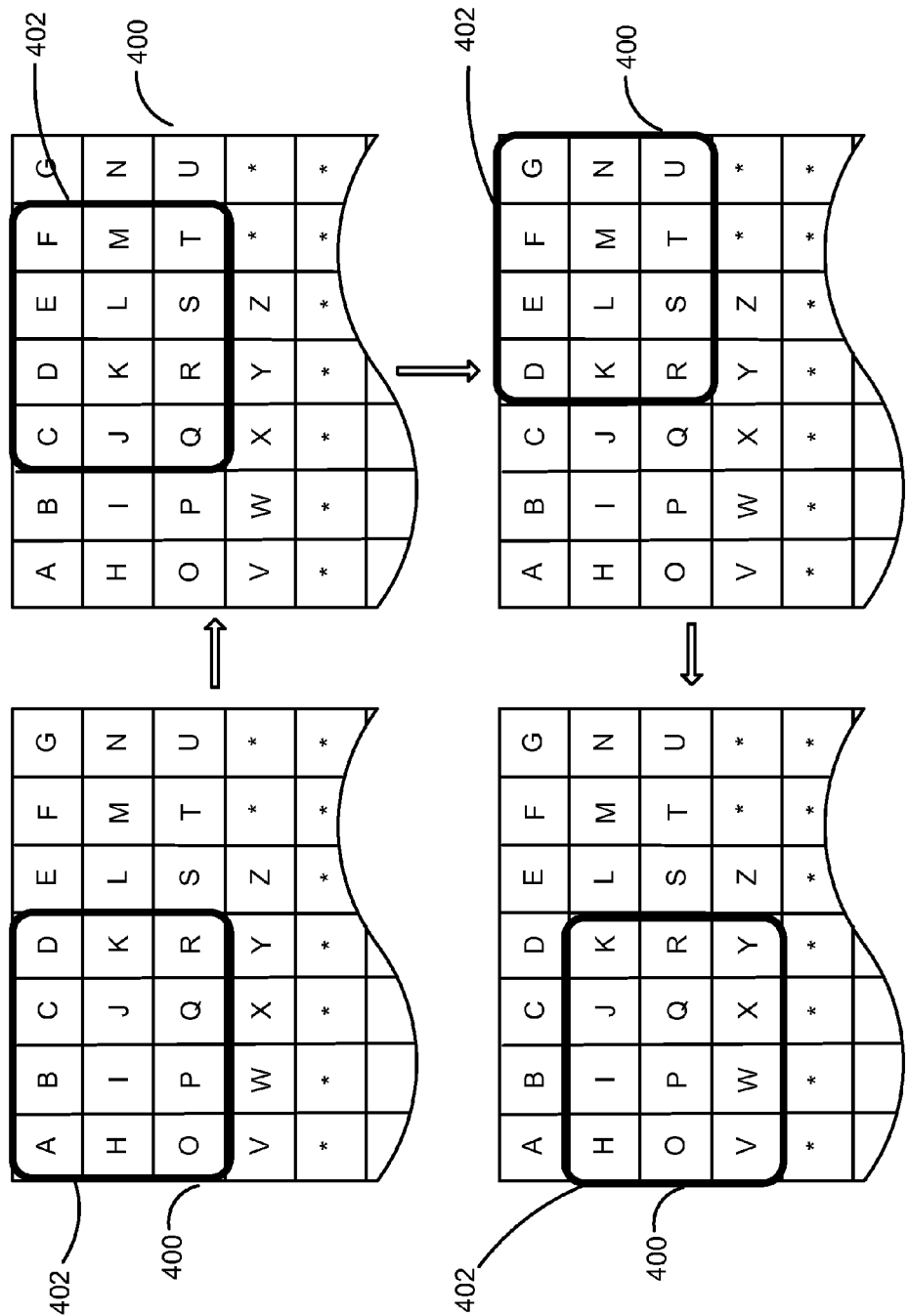
FIG. 4 is a schematic diagram of an example toner estimation scheme utilizing a moving window.

FIG. 4 is a schematic diagram of an example toner estimation scheme utilizing a moving window. A portion of print image 400 includes pixels A-Z which constitute a portion of an image to be printed. Processing of the image may involve utilizing a moving window, such as window 402. In embodiments, look-up address generation for toner estimation is based in part on recent movement of window 402. In a first position, window 402 includes pixels A, B, C, D, H, I, J, K, O, P, Q, and R. In a second position, window 402 moves two columns to the right to include pixels C, D, E, F, J, K, L, M, Q, R, S, and T. In a third position, window 402 moves only 1 column to the right and includes pixels D, E, F, G, K, L, M, N, R, S, T and U. In a fourth position, window 402 moves down one row, and back to the left side of print image 400, and includes H, I, J, K, O, P, Q, R, V, W, X, and Y. Based on vertical and/or horizontal movement of window 402, different functions or schemes are utilized to generate a look-up address.

The following table shows different functions for look-up address generation based on vertical window movement. A different table could be built embodying look-up table generation based on horizontal window movement. The following table is exemplary, and is meant to be taken in a non-limiting sense. The table shows address table (LUT) functions for a toner estimate for the location on print image 400 associated with pixel I.

| Window Vertical Movement | Look-up Table (LUT) Address Function | Toner Estimate (TE) Calculation |
|---|---|---|
| 0 lines | — | TE = TE + 0 |
| 1 lines | ADD = F(B, H, I, J, P) | TE = TE + LUT[ADD] |
| 2 lines | ADD = F(B, C, W, H, J, O, Q, I, P) | TE = TE + LUT[ADD] |

The above table illustrates LUT address functions for vertical window movements of 0, 1 and 2 lines. In various embodiments, such vertical window movements occur in various instances. For example, when an image is scaled from 600 by 600 dots per pixel to 400 by 600 dots per pixel (i.e., scaling of $\frac{2}{3}^{rd}$ in the vertical direction), successive vertical window movements of 1 line each in the original image result in alternate vertical movements of 1 line and 2 lines in the scaled image. Thus, in the scaled image, the vertical window movements can be of 0 line, 1 line or 2 lines. For such vertical movements in the scaled image, the LUT address function changes, for example, in accordance with the above table.

Furthermore, a vertical movement of 0 lines does not necessitate a change in the toner estimation (and accordingly, no LUT address function is desired), as illustrated in the above table. On the other hand, in an event of a vertical movement of one line, the LUT address function is a function of pixels B, H, I, J and P. However, in an event of a vertical movement of two lines, the LUT address function is a function of several other pixels (as more pixels need to be averaged to accommodate the vertical movement of two lines), as illustrated in the above table.

Although the above table illustrates look-up table generation based on vertical window movements, a similar table can be generated for horizontal movement as well.

Process for Print Substance Usage Estimation

Figure 5:
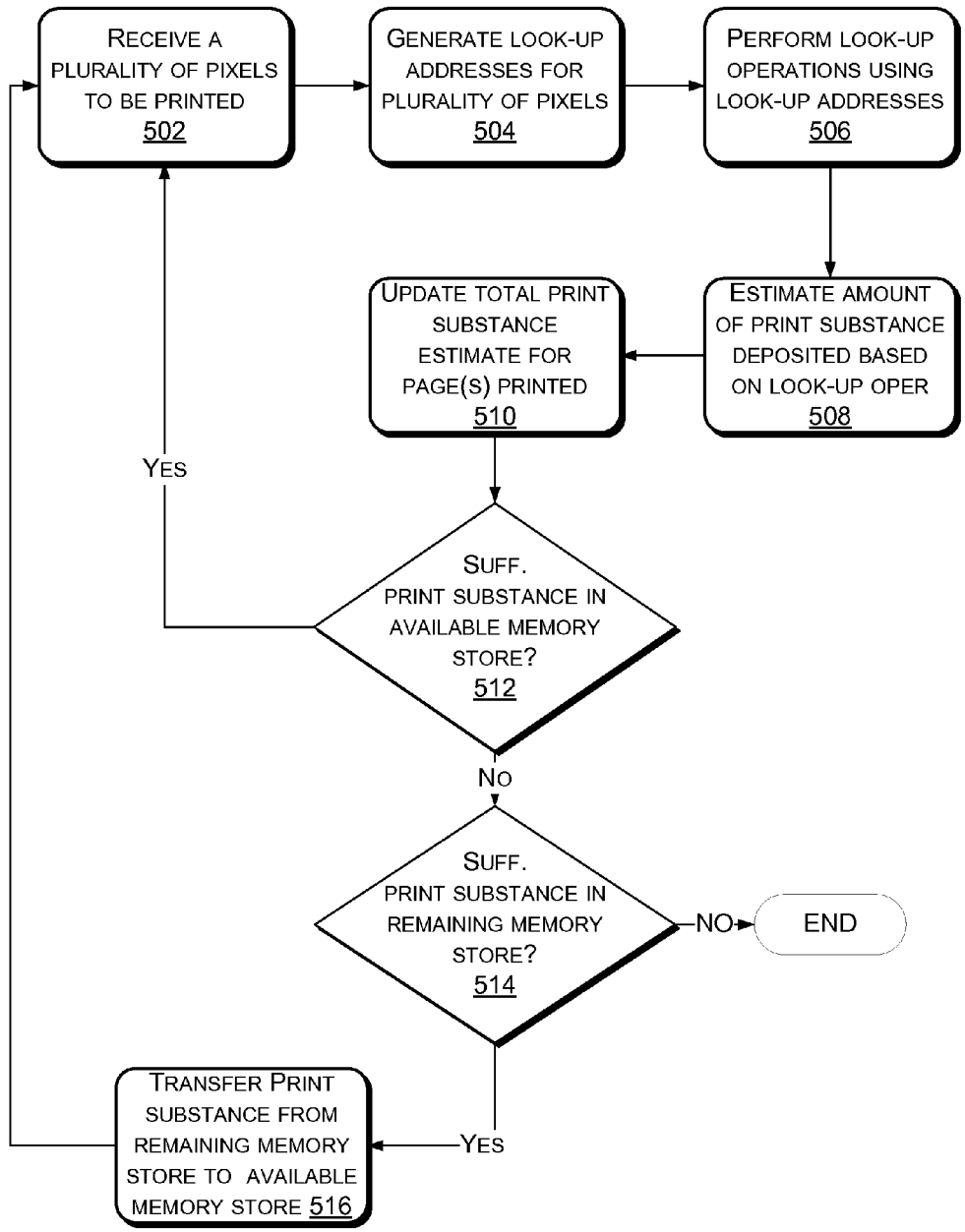
FIG. 5 is a flowchart showing an example process of print substance usage estimation in accordance with various embodiments.

FIG. 5 is a flowchart illustrating an exemplary process of print substance usage estimation in accordance with various embodiments. The exemplary methods in FIG. 5 are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods according to various embodiments of the present disclosure. Additionally, individual blocks may be omitted from the method without departing from the spirit and scope of the subject matter described herein. In the context of software, the blocks represent one or more computer instructions that, when executed by one or more processors, perform the recited operations.

Process 500 includes receiving a plurality of pixels of a page to be printed, 502. The plurality of pixels is arranged as a series of rows and columns that define image(s) of the page. The pixels are represented as n-bit binary elements, such as 1, 2, or 4-bit numbers (or other number of bits) that represent a darkness level.

Process 500 includes generating look-up addresses for the plurality of pixels based on pixel bits (the n-bit binary elements that represent darkness levels) of a pixel, and the pixel bits of one or more other pixels that are proximal to the one of the plurality of pixels, 504. The generating is, in embodiments, an iterative process that produces look-up addresses for some or all of the plurality of pixels. Because the look-up addresses for the locations are based not only on the pixels at those locations, but also pixels that are proximal to the locations, individual pixels will be used to determine more than one look-up address. For example, embodiments use pixel bits of a particular pixel to generate the look-up address for a location associated with that particular pixel. Embodiments also use pixel bits of that particular pixel to generate the look-up address of location associated with a neighboring pixel (and vice versa).

Embodiments use less than all pixel bits of the pixel and its neighboring pixels are used, to generate the address. Embodiments combine pixel bits and use the results to form one or more bit positions of the look-up address. For example, pixel bits for neighboring pixels that are vertically proximal to the pixel may be added together and the results used to form one or more bit positions of the generated look-up address. In another example, pixel bits for neighboring pixels that are horizontally proximal are added together and the results used to form one or more bit positions of the generated look-up address. Other operations may be used to combine pixels. Pixel bits, or the results of operations combining pixel bits, may be shifted—either right or left-shifted—and the results used to form one or more bit positions of the generated look-up address. Other operations not described herein are also used in embodiments, and embodiments are not limited to those operations outlined herein.

Because neighboring pixels influence the amount of toner that is deposited at a particular location, utilizing neighboring pixel bits to generate a look-up address allows for a more accurate estimation of the amount of toner deposited at a particular location. In embodiments, the one or more neighboring pixels used to generate the look-up address are directly below and/or directly above the one of the plurality of pixels with respect to an orientation of the page to be printed. In embodiments, they are directly to the left and/or directly to the right of the one of the plurality of pixels with respect to an orientation of the page to be printed. More generally, the one or more neighboring pixels include one or more vertically adjacent pixels and/or one or more horizontally adjacent pixels. One or more of the neighboring pixels used for generating the look-up address may be directly adjacent (i.e., right next to the pixel at issue), but it need not be directly adjacent.

Process 500 also includes performing look-up operations to a look-up table using the generated look-up addresses, 506. The results of the look-up operations include discrete toner estimation amounts that are deposited at locations on the page associated with the pixels. Because neighboring pixel bits are used to generate the look-up addresses, results of the look-up operations are influenced by the neighboring pixel bits.

Process 500 also includes estimating an amount of print substance deposited on the page at locations associated with corresponding ones of the plurality of pixels based on results of the look-up operations, 508. Because the results of the look-up operations are discrete toner estimation amounts for the various locations on the page, estimating the amount of print substance (such as toner) deposited on the page at the various locations involves, in embodiments, simply utilizing the results of the look-up operations as an estimate.

Process 500 also includes updating a total print substance estimate for a page or page(s) being printed, 510. Updating the print substance estimate involves, in embodiments, adding up the various print substance estimates for the locations on the page to form a total print substance estimate for one or more printed pages. In embodiments, updating the print substance estimate may involve decrementing (subtracting) the various toner estimates from an available print substance value.

Process 500 also includes determining whether there remains sufficient print substance available in an available print substance memory store of the printer, 512. This determination is based on the toner estimate. For example, if the available print substance store is decremented to a value that is less than an amount needed to perform an additional print job, a determination is made that there is insufficient available print substance. If there is sufficient print substance remaining, process 500 moves back to 502, and additional pixels are received for printing. When sufficient print substance does not remain in the available print substance store, embodiments include determining whether a memory store of the print substance cartridge indicates that sufficient print substance remains in the print substance cartridge, 514. If not, process 500 ends, and an indication may be made to replace the print substance cartridge.

If sufficient print substance remains in the print substance cartridge according to a memory store on the print substance cartridge, embodiments perform a transfer from the memory store of the print substance cartridge to an available print substance memory store on the printer, 516. These memory stores (on both the print cartridge and in the printer) are not stores of actual print substance. Rather, these are stores of data representing estimated amounts of print substance. Also, embodiments of the present disclosure include updating a remaining print substance store directly on a memory of the print cartridge itself, rather than in a separate memory of the printer (or other device such as a copier, scanner, fax machine, combination device, and so forth).

Look-Up Table Generation

Figure 6:
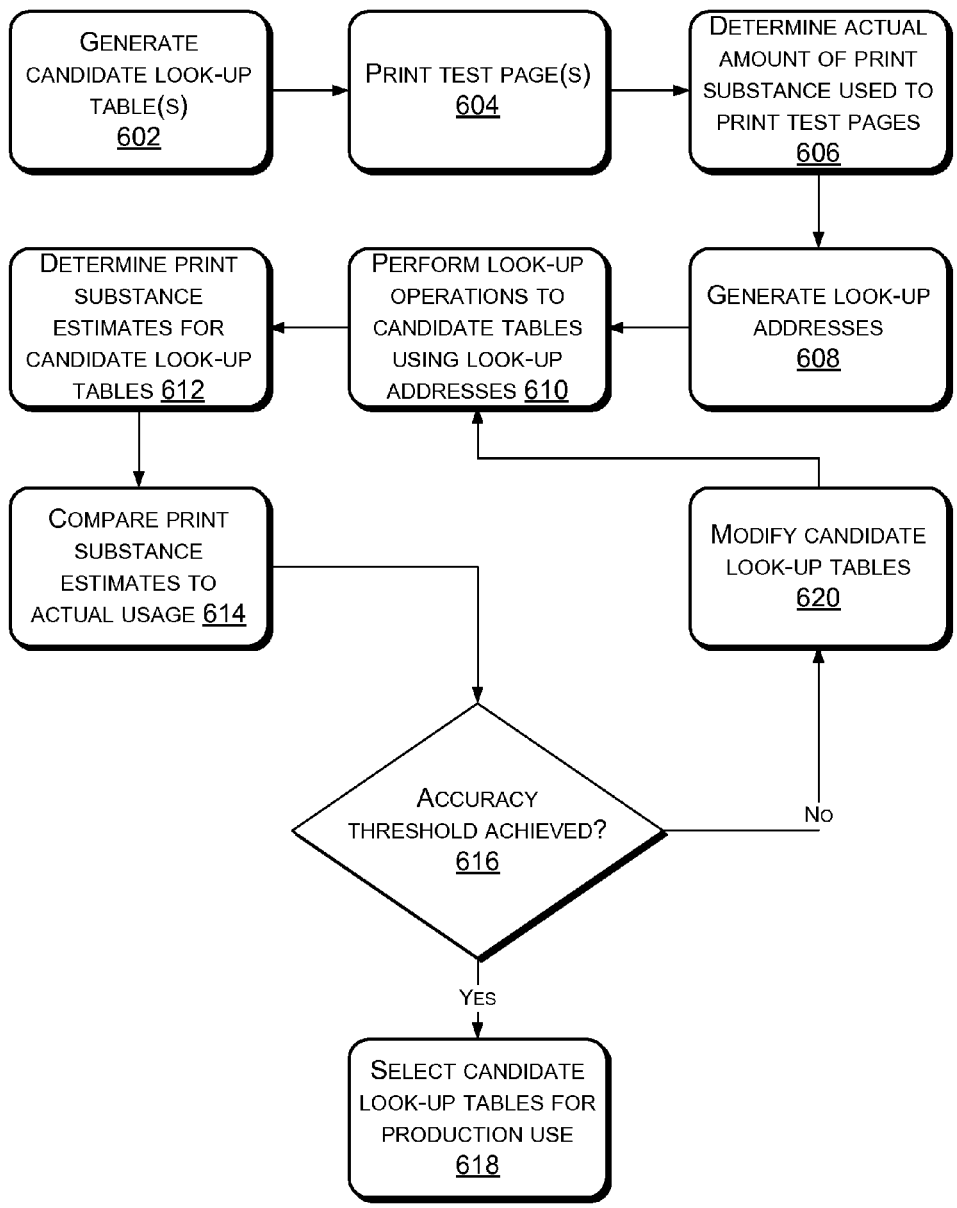
FIG. 6 is a flowchart showing an example process of determining a print substance estimation look-up table in accordance with various embodiments.

FIG. 6 is a flowchart illustrating an exemplary process of determining a print substance estimation look-up table in accordance with various embodiments. The exemplary methods in FIG. 6 are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods according to various embodiments of the present disclosure. Additionally, individual blocks may be omitted from the method without departing from the spirit and scope of the subject matter described herein. In the context of software, the blocks represent one or more computer instructions that, when executed by one or more processors, perform the recited operations.

Process 600 includes generating one or more candidate look-up tables for print substance estimation, 602. The candidate look-up tables may be generated using linear or non-linear functions, existing look-up tables for similar printers, actual print substance usage in the same or similar printers, engineering estimates, and so forth.

Process 600 includes printing one or more test pages, 604. The test pages may be selected to be representative of the type of printing that the printer is assumed likely to be used for. Example test pages include various combinations of text documents, web pages, photographic or other images, test patterns that emphasize known issues in printing operations, and so forth.

Process 600 includes determining an actual amount of print substance used to print the test page, 606. Determining an actual amount of print substance includes, in various embodiments, weighing a print substance cartridge before and after the print pages are printed, measuring a volume of print substance in the print substance cartridge both before and after the print pages are printed, and so forth.

Process 600 includes generating look-up addresses for locations on the test pages based on pixel bits, and including neighboring and/or proximal pixel bits, as described elsewhere within this Detailed Description, 608. For example, in addition to pixel bits of pixels corresponding to the locations on the test pages, vertically proximal pixel bits and/or horizontally proximal pixel bits are also used to determine look-up addresses for locations on the test pages.

Process 600 includes performing, for the various candidate look-up tables, look-up operations based on the generated look-up addresses, 610. The look-up operations are performed separately for each of the one or more candidate look-up tables, and results of the look-up operations for the candidate look-up tables are separately stored so that the results can later be compared to an actual print substance usage amount.

Process 600 includes determining, for the test pages, individual print substance estimation amounts for the one or more candidate look-up tables based on the results of the look-up operations, 612. Such determining is described elsewhere within this Detailed Description. As noted herein, results of the look-up operations include discrete estimates for the amount of print substance deposited at the locations of the test pages, according to the individual candidate look-up tables. Determining individual print substance estimation amounts for a particular candidate table includes summing up the results from the look-up operations to the particular look-up table. Such summing is done for all candidate look-up tables to produce print substance estimates for each table.

Process 600 includes comparing the individual print substance estimation amounts for the individual candidate look-up tables to the actual amount of print substance used to print the test pages, 614. Embodiments determine whether a certain accuracy threshold has been achieved for any of the one or more candidate look-up tables, 616. Accuracy thresholds according to embodiments include a certain percentage threshold, such as for example percentage thresholds between 90% to 99% accuracy, 99.0% to 99.9% accuracy, and so forth.

Process 600 includes selecting for production use one or more of the candidate look-up tables that meet or exceed an accuracy threshold, 618. Process 600 includes modifying candidate look-up tables, 620, such as when no candidate look-up tables meet or exceed an accuracy threshold. Although process 600 shows that modifying candidate look-up tables occurs if none of the tables meet a predetermined accuracy threshold, embodiments also include modifying tables that meet a predetermined accuracy threshold. Modifications to tables are made based on several factors, such as analysis of the actual toner usage and the estimates produced by the candidate look-up tables. In other embodiments, genetic modification (pseudorandom mutation) of the look-up tables is performed. Embodiments are not limited to any one type or types of modifications to the candidate tables. Also, embodiments are not limited to modifying candidate look-up tables. Embodiments also generate new tables instead of, or in addition to, modifying existing tables. Once the new and/or modified tables are created, process 600 returns to 610 to test the new candidate tables against the same or new test print results. Automatic generation of candidate tables, and/or automatic modification of existing tables, allow the process of identifying a sufficiently accurate look-up table to be at least partially automated.

Exemplary Look-Up Table Generation Service

Figure 7:
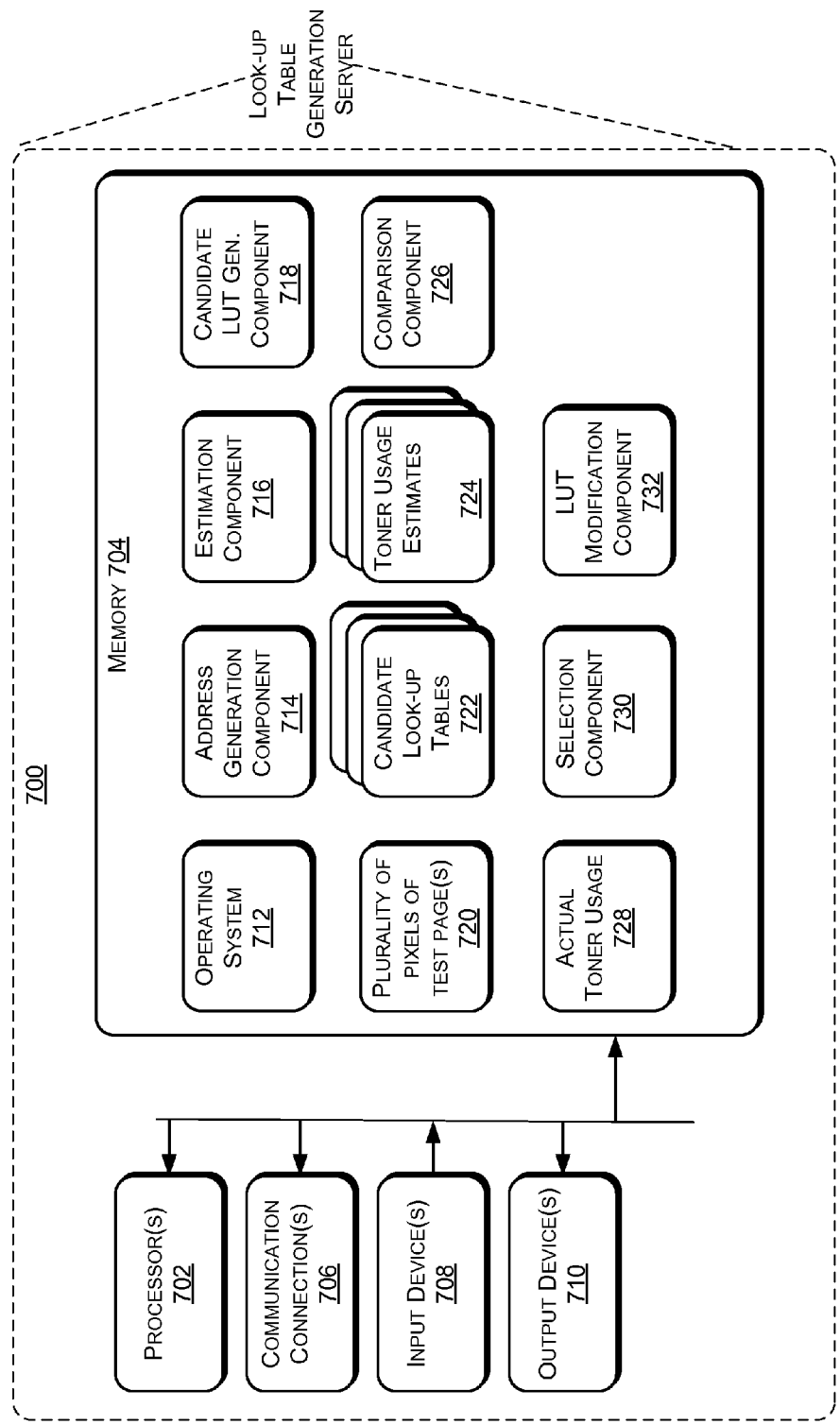
FIG. 7 is an example computing system usable to provide a look-up table generation service.

FIG. 7 illustrates an exemplary computing system usable to perform a look-up table generation service. Look-up table generation server 700 may be configured as any suitable computing device capable of implementing look-up table generation services. According to various non-limiting examples, suitable computing devices may include personal computers (PCs), servers, server farms, datacenters, combinations of these, or any other computing device(s) capable of storing and executing all or part of a look-up table generation service.

In one example configuration, look-up table generation server 700 comprises one or more processors 702 and memory 704. Look-up table generation server 700 may also contain communication connection(s) 706 that allow communications with various devices. The look-up table generation server 700 may also include one or more input devices 708, such as a keyboard, mouse, pen, voice input device, touch input device, etc., and one or more output devices 710, such as a display, speakers, printer, etc. coupled communicatively to the processor(s) 702 and memory 704.

The memory 704 may store program instructions that are loadable and executable on the processor(s) 702, as well as data generated during execution of, and/or usable in conjunction with, these programs. In the illustrated example, memory 704 stores an operating system 712, address generation component 714, estimation component 716, and candidate look-up table generation component 718.

Address generation component 714 is configured to generate look-up addresses based on pixel bits of plurality of pixels of test page data 720. Address generation component 714 is configured to generate look-up addresses for various locations on a page to be printed that correspond to plurality of pixels of test page data 720, as is described elsewhere within this Detailed Description.

Candidate look-up table generation component 718 is configured to generate one or more candidate look-up tables 722. One or more candidate look-up tables 722 may be generated using linear or non-linear functions, existing look-up tables for similar printers, actual toner usage in the same or similar printers, engineering analysis, and so forth.

Estimation component 716 is configured to perform look-up operations to one or more candidate look-up tables 722 using look-up addresses generated by address generation component 714. Such look-up operations are the same as, or similar to, look-up operations described elsewhere within this Detailed Description. Estimation component 716 is configured to generate toner usage estimates 724 based on results of the look-up operations to the one or more candidate look-up tables 722. Individual ones of toner usage estimates 724 correspond to individual ones of candidate look-up tables 722, and represent separate toner usage estimations for the test pages according to the candidate look-up tables 722.

Comparison component 726 is configured to compare toner usage estimates 724 to actual toner usage 728. Actual toner usage 728 is determined, in various embodiments, by printing the test pages and weighing the toner cartridge before and after the test pages are printed to determine a mass of toner used to print the test pages. The mass of used toner may be converted to a volume of used toner based for example on toner density. Alternatively, actual toner usage 728 is determined by measuring a volume of toner both before and after the test pages are printed to determine a volume of toner used during printing. Toner is generally measured in grams and more particularly, units of toner are generally measured in pico-grams. Ink is generally measured in liters and more particularly, units of ink are generally measured in pico-liters. Additionally, for liquids a single length dimension or percentage may be used if the shape of the container holding the liquid is known and fixed—i.e., how full is the cylinder?

Comparison component 726 determines a level of accuracy for toner usage estimates 724. For example, comparison component 726 determines one or more candidate look-up tables 722 that meet a certain threshold accuracy, which may be expressed as percentage accuracy or another measure of accuracy. Selection component 730 is configured to select one or more candidate look-up tables 722 based on the results of the comparison with actual toner usage 728. In an exemplary embodiment, a candidate look-up table that meets a certain threshold for accuracy is selected for use in production use, such as in a manufactured printer.

Look-up table modification component 732 is configured to modify one or more of the candidate look-up tables 722. Modifications to candidate look-up tables 722 may be made based on several factors, such as analysis of the actual toner usage and the estimates produced by candidate look-up tables 722. In embodiments, look-up table modification component 732 is configured to employ genetic modification (pseudorandom mutation) of the look-up tables. Embodiments are not limited to any one type or types of modifications to the candidate look-up tables 722. Also, embodiments are not limited to modifying candidate look-up tables 722. Embodiments of the look-up table modification component 732 are configured to generate new tables instead of, or in addition to, modifying existing ones. Once the new and/or modified tables are created, the new or modified candidate tables are tested as described above. Automatic generation of candidate tables, and/or automatic modification of existing tables, allow the process of identifying a sufficiently accurate look-up table to be at least partially automated.

Computer-Readable Media

Depending on the configuration and type of computing system used, memory 704 may include volatile memory (such as random access memory (RAM)) and/or non-volatile memory (such as read-only memory (ROM), flash memory, etc.). Memory 704 may also include additional removable storage and/or non-removable storage including, but not limited to, flash memory, magnetic storage, optical storage, and/or tape storage that may provide non-volatile storage of computer readable instructions, data structures, program modules, and other data.

Memory 704 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Operations of processes 500 and 600 can be suitably combined and may comport with techniques and/or configurations described in connection with FIGS. 1-4 in various embodiments.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method for estimating usage of a print substance while printing an image, the method comprising:
   receiving the image to be printed, wherein the image comprises at least (i) a first pixel and (ii) a plurality of pixels that are proximal to the first pixel in the image, wherein the plurality of pixels comprises at least a second pixel, wherein each of the first pixel and the plurality of pixels comprises corresponding pixel bits representing a color level of the corresponding pixel, and wherein the second pixel includes (i) a first pixel bit and (ii) a second pixel bit;
   based on (i) pixel bits of the first pixel, and (ii) one or more pixel bits of the plurality of pixels, generating, corresponding to the first pixel, a first look-up address, wherein the first pixel bit of the second pixel is used to generate the first look-up address, and wherein the second pixel bit of the second pixel is not used to generate the first look-up address; and
   based on the first look-up address, estimating an amount of print substance deposited on a print medium at a location associated with the first pixel while printing the image.

2. The method of claim 1, wherein:
   the plurality of pixels comprises at least (i) the second pixel and (ii) a third pixel;
   the third pixel includes (i) a third pixel bit and (ii) a fourth pixel bit;
   the third pixel bit of the third pixel is used to generate the first look-up address; and
   the fourth pixel bit of the third pixel is not used to generate the first look-up address.

3. The method of claim 2, wherein generating the first look-up address comprises:
   adding the first pixel bit of the second pixel to the third pixel bit of the third pixel; and
   based on adding the first pixel bit of the second pixel to the third pixel bit of the third pixel, generating the first look-up address.

4. The method of claim 3, wherein generating the first look-up address comprises:
   subsequent to adding the first pixel bit of the second pixel to the third pixel bit of the third pixel, right-shifting a result of adding the first pixel bit of the second pixel to the third pixel bit of the third pixel; and based on right-shifting the result of adding the first pixel bit of the second pixel to the third pixel bit of the third pixel, generating the first look-up address.

5. The method of claim 1, wherein:
the first pixel includes (i) a third pixel bit and (ii) a fourth pixel bit;
the third pixel bit of the first pixel is used to generate the first look-up address; and
the fourth pixel bit of the first pixel is not used to generate the first look-up address.

6. The method of claim 1, wherein:
the first pixel bit of the second pixel is a most significant bit of the pixel bits of the second pixel; and
the second pixel bit of the second pixel is a least significant bit of the pixel bits of the second pixel.

7. The method of claim 1, wherein estimating the amount of print substance deposited on the print medium at the location associated with the first pixel while printing the image further comprises:
using the first look-up address, accessing a look-up table; and
based on accessing the look-up table, estimating the amount of print substance deposited on the print medium at the location associated with the first pixel while printing the image.

8. The method of claim 1, further comprising:
iteratively generating, corresponding to each of the plurality of pixels, a corresponding plurality of look-up addresses; and
based on the plurality of look-up addresses, iteratively estimating amounts of print substance deposited on the print medium at locations associated with each of the plurality of pixels while printing the image.

9. The method of claim 1, wherein the plurality of pixels includes a pixel directly below or directly above the first pixel with respect to an orientation of the image.

10. The method of claim 1, wherein the plurality of pixels includes a pixel directly to the left or directly to the right of the first pixel with respect to an orientation of the image.

11. The method of claim 1, further comprising:
based on the estimated amount of print substance deposited on the print medium at the location associated with the first pixel while printing the image, updating a current estimation of print substance available for printing.

12. A system comprising:
a print mechanism to print an image, wherein the image comprises at least (i) a first pixel and (ii) a plurality of pixels that are proximal to the first pixel in the image, wherein the plurality of pixels comprises at least a second pixel, wherein each of (i) the first pixel and (ii) the plurality of pixels comprises corresponding pixel bits representing a color level of the corresponding pixel, and wherein the second pixel includes (i) a first pixel bit and (ii) a second pixel bit;
an address generation component configured to, based on (i) pixel bits of the first pixel and (ii) one or more pixel bits of the plurality of pixels, generate, corresponding to the first pixel, a first look-up address, wherein the first pixel bit of the second pixel is used to generate the first look-up address, and wherein the second pixel bit of the second pixel is not used to generate the first look-up address; and
an estimation component configured to, based on the first look-up address, estimate an amount of print substance deposited on a print medium at a location associated with the first pixel while the image is printed.

13. The system of claim 12, wherein:
the plurality of pixels comprises at least (i) the second pixel and (ii) a third pixel;
the third pixel includes (i) a third pixel bit and (ii) a fourth pixel bit;
the third pixel bit of the third pixel is used to generate the first look-up address; and
the fourth pixel bit of the third pixel is not used to generate the first look-up address.

14. The system of claim 13, wherein the address generation component is configured to generate the first look-up address by:
adding the first pixel bit of the second pixel to the third pixel bit of the third pixel; and
based on adding the first pixel bit of the second pixel to the third pixel bit of the third pixel, generating the first look-up address.

15. The system of claim 14, wherein the address generation component is further configured to generate the first look-up address by:
subsequent to adding the first pixel bit of the second pixel to the third pixel bit of the third pixel, right-shifting a result of adding the first pixel bit of the second pixel to the third pixel bit of the third pixel; and
based on right-shifting the result of adding the first pixel bit of the second pixel to the third pixel bit of the third pixel, generating the first look-up address.

16. The system of claim 12, wherein:
the first pixel includes (i) a third pixel bit and (ii) a fourth pixel bit;
the third pixel bit of the first pixel is used to generate the first look-up address; and
the fourth pixel bit of the first pixel is not used to generate the first look-up address.

17. The system of claim 12, wherein:
the first pixel bit of the second pixel is a most significant bit of the pixel bits of the second pixel; and
the second pixel bit of the second pixel is a least significant bit of the pixel bits of the second pixel.

18. The system of claim 12, wherein the estimation component is configured to estimate the amount of print substance deposited on the print medium at the location associated with the first pixel while the image is printed by:
using the first look-up address, accessing a look-up table; and
based on accessing the look-up table, estimating the amount of print substance deposited on the print medium at the location associated with the first pixel while printing the image.

19. The system of claim 12, further comprising:
memory configured to store an estimate of print substance available for printing.

20. The system of claim 19, wherein the estimation component is further configured to:
based on the estimated amount of print substance deposited on the print medium at the location associated with the first pixel while printing the image, update, in the memory, the estimation of print substance available for printing.

21. The system of claim 12, wherein the plurality of pixels comprises at least (i) the second pixel and (ii) a third pixel, and wherein the address generation component is configured to generate the first look-up address by:
adding the first pixel bit of the second pixel to a third pixel bit of the third pixel; and based on adding the first pixel bit of the second pixel to the third pixel bit of the third pixel, generating the first look-up address.

22. The method of claim 1, wherein the plurality of pixels comprises at least (i) the second pixel and (ii) a third pixel, wherein generating the first look-up address comprises:
   adding the first pixel bit of the second pixel to a third pixel bit of the third pixel; and
   based on adding the first pixel bit of the second pixel to the third pixel bit of the third pixel, generating the first look-up address.

\* \* \* \* \*